(12) United States Patent
Park et al.

(10) Patent No.: US 11,449,331 B2
(45) Date of Patent: Sep. 20, 2022

(54) VEHICULAR UPDATE SYSTEM AND CONTROL METHOD THEREOF

(71) Applicant: LG ELECTRONICS INC., Seoul (KR)

(72) Inventors: Junsang Park, Seoul (KR); Sangwook Lee, Seoul (KR); Kyusuk Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 233 days.

(21) Appl. No.: 16/490,514

(22) PCT Filed: Jan. 25, 2018

(86) PCT No.: PCT/KR2018/001113
§ 371 (c)(1),
(2) Date: Aug. 30, 2019

(87) PCT Pub. No.: WO2019/146812
PCT Pub. Date: Aug. 1, 2019

(65) Prior Publication Data
US 2020/0348924 A1 Nov. 5, 2020

(51) Int. Cl.
*H04L 29/06* (2006.01)
*G06F 8/65* (2018.01)
(Continued)

(52) U.S. Cl.
CPC ............ *G06F 8/66* (2013.01); *G07C 5/008* (2013.01); *H04L 9/3247* (2013.01); *H04L 9/3268* (2013.01); *H04L 9/3297* (2013.01)

(58) Field of Classification Search
CPC . G06F 8/66; G06F 21/57; G06F 21/64; G06F 8/65; G06F 16/128; G07C 5/008;
(Continued)

(56) References Cited

U.S. PATENT DOCUMENTS

| 2015/0074420 A1* | 3/2015 | Sone ................ G06F 8/654 |
| | | 713/187 |
| 2019/0108009 A1* | 4/2019 | Haase ................ G06F 8/65 |
| 2021/0126939 A1* | 4/2021 | Sullivan .............. G06Q 20/388 |

FOREIGN PATENT DOCUMENTS

| KR | 101063076 B1 * | 10/2011 | ......... H04N 21/2351 |
| KR | 20170119645 A * | 10/2017 | ........... H04L 9/3265 |

OTHER PUBLICATIONS

Idrees, Muhammad Sabir, et al. "Secure automotive on-board protocols: A case of over-the-air firmware updates." International Workshop on Communication Technologies for Vehicles. Springer, Berlin, Heidelberg, 2011. (Year: 2011).*

* cited by examiner

*Primary Examiner* — Joseph P Hirl
*Assistant Examiner* — Ka Shan Choy
(74) *Attorney, Agent, or Firm* — Lee, Hong, Degerman, Kang & Waimey PC

(57) ABSTRACT

Disclosed is a vehicular update system including a communication device configured to communicate between a server and a controller included in a vehicle, a memory, and a controller configured to, (i) when a public key set including a root public key for verifying a root signature is stored in the memory, acquire the root signature from the server and verify root metadata based on the acquired root signature and the root public key of the public key set pre-stored in the memory, and configured to, (ii) when the public key set is not stored in the memory, acquire, from the server, root metadata including a public key set and a root signature obtained by performing a digital signature on a hash value of the public key set using a root private key, verify the root metadata based on the root public key of the acquired root metadata and the root signature, and store the public key set.

20 Claims, 11 Drawing Sheets

(51) Int. Cl.
 *G07C 5/00* (2006.01)
 *H04L 9/32* (2006.01)
(58) Field of Classification Search
 CPC ... H04L 9/3247; H04L 9/3268; H04L 9/3297; H04L 9/3265; H04L 9/0891; H04L 2209/84; H04L 29/08; H04L 9/3263; H04L 9/085; H04L 9/3236; H04L 63/123; H04L 67/34
 See application file for complete search history.

VEHICULAR UPDATE SYSTEM AND CONTROL METHOD THEREOF

CROSS-REFERENCE TO RELATED APPLICATIONS

This application is the National Stage filing under 35 U.S.C. 371 of International Application No. PCT/KR2018/001113, filed on Jan. 25, 2018, the contents of which are all hereby incorporated by reference herein in its entirety.

TECHNICAL FIELD

The present invention relates to a vehicular update system and a control method thereof.

BACKGROUND ART

A vehicle is a device that carries a passenger in a direction intended by the passenger. A car is a major example of such a vehicle.

To increase the convenience of vehicle users, a vehicle is equipped with various sensors and electronic devices. Especially, the vehicle is equipped with hardware for controlling various devices included in the vehicle and software for controlling the hardware.

Recently, there have been vehicles equipped with several tens of electronic control units (ECUs). Such an ECU frequently needs to be updated after initial settings in a manufacturing process because system error needs to be overcome or security needs to be enhanced.

In this case, an ECU of a vehicle receives update data from an external device (e.g., a server) connected online or offline and updates a system.

However, there is the concern that compromised data, which is not update data, invades a vehicle system, for example, hacking attempt during an update procedure, and in particular, since a vehicle is a transportation means on which the human rides, data security is very important compared with other communication environments for the reason of safety.

For this reason, a public key cryptography is used in data transmission and reception between a vehicle and an external device, and in this case, the amount of data to be processed is larger than in the case in which a symmetric key cryptography is used, and thus there is a problem in that a long time is taken to verify and update data.

Accordingly, there is a need for an enhanced method of data transmission and reception between a vehicle and an external device.

DISCLOSURE

Technical Problem

It is an object of the present invention to reduce the amount of transmitted and received data and to effectively receive the data when a vehicle acquires data from a device outside the vehicle.

It is another object of the present invention to increase a security level of data when a vehicular system acquires data from an external device.

The technical problems solved by the embodiments are not limited to the above technical problems and other technical problems which are not described herein will become apparent to those skilled in the art from the following description.

Technical Solution

In accordance with the present invention, the above and other objects can be accomplished by the provision of a vehicular update system including a communication device configured to communicate between a server and a controller included in a vehicle, a memory, and a controller configured to, (i) when a public key set including a root public key for verifying a root signature is stored in the memory, acquire the root signature from the server and verify root metadata based on the acquired root signature and the root public key of the public key set pre-stored in the memory, and configured to, (ii) when the public key set is not stored in the memory, acquire, from the server, root metadata including a public key set and a root signature obtained by performing a digital signature on a hash value of the public key set using a root private key, verify the root metadata based on the root public key of the acquired root metadata and the root signature, and store the public key set.

Details of other embodiments are included in a detailed description and drawings.

Advantageous Effects

According to the above technical solution, embodiments of the present invention may provide one or more of the following effects.

First, when a vehicle acquires data from an external device of a vehicle, data transmitted and received to verify data may be reduced, and thus a time taken to verify an external device and the received data by a vehicular system may be reduced.

Second, when a vehicle acquires data from an external device of a vehicle, data may be effectively protected from hacking risk of a third party or forging or falsification of data.

The effects of the present invention are not limited to the above-described effects and other effects which are not described herein may be derived by those skilled in the art from the following description of the embodiments of the disclosure.

BEST MODE

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest unique meanings or functions. In describing embodiments disclosed in this specification, a detailed description of relevant well-known technologies may not be given in order not to obscure the subject matter of the present invention. In addition, the accompanying drawings are merely intended to facilitate understanding of the embodiments disclosed in this specification and not to restrict the technical spirit of the present invention. In addition, the accompanying drawings should be understood as covering all equivalents or substitutions within the scope of the present invention.

Terms including ordinal numbers such as first, second, etc. may be used to explain various elements. However, it will be appreciated that the elements are not limited to such terms. These terms are merely used to distinguish one element from another.

Stating that one constituent is "connected" or "linked" to another should be understood as meaning that the one constituent may be directly connected or linked to another constituent or another constituent may be interposed between the constituents. On the other hand, stating that one constituent is "directly connected" or "directly linked" to another should be understood as meaning that no other constituent is interposed between the constituents.

As used herein, the singular forms "a", "an", and "the" are intended to include the plural forms as well, unless context clearly indicates otherwise.

In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

The term "vehicle" employed in this specification may include an automobile and a motorcycle. Hereinafter, description will be given mainly focusing on an automobile.

The vehicle described in this specification may include a vehicle equipped with an internal combustion engine as a power source, a hybrid vehicle equipped with both an engine and an electric motor as a power source, and an electric vehicle equipped with an electric motor as a power source.

First Embodiment

Figure 1:
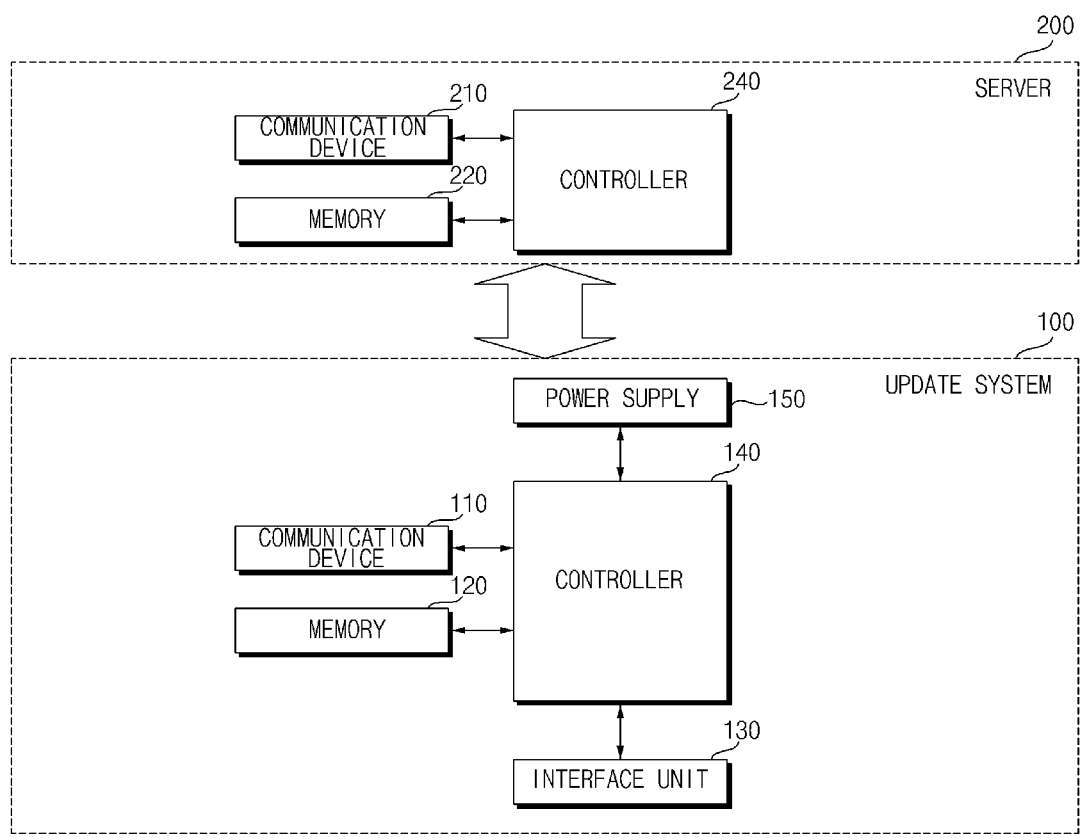
FIG. 1 is a block diagram showing a configuration of a vehicular update system according to an embodiment of the present invention.

<Configuration>
FIG. 1 is a block diagram showing a configuration of a vehicular update system according to an embodiment of the present invention.

Referring to FIG. 1, an update system 100 may include a communication device 110, a memory 120, an interface unit 130, a controller 140, and a power supply 150.

In some embodiments, the update system 100 may not include some of the above components or may further include a new component in addition to the components.

The update system 100 may be included in a vehicle 1.

The communication device 110 is used to communicate with an external device. The external device may be another vehicle, a mobile terminal, or a server 200.

The communication device 110 may include at least one of a transmission antenna and a reception antenna, for communication, or a Radio Frequency (RF) circuit and device, for implementing various communication protocols.

The communication device 110 may include a short-range communication unit, a location information unit, a vehicle-to-everything (V2X) communication unit, an optical communication unit, a broadcasting transceiver unit, an intelligent transport systems (ITS) communication unit, and a processor.

In some embodiments, the communication device 110 may further include a new component in addition to the components described below, or may not include some of the described components.

The short-range communication unit is a unit for conducting short-range communication. The short-range communication unit may support short-range communication, using at least one of Bluetooth™, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, or Wireless Universal Serial Bus (Wireless USB).

The short-range communication unit may conduct short-range communication between the update system 100 and at least one external device by establishing a wireless area network.

The location information unit is a unit configured to acquire information about a location of the central server 100. For example, the location information unit may include a global positioning system (GPS) module or a differential global positioning system (DGPS) module.

The V2X communication unit is a unit used for wireless communication with a server (by vehicle-to-infrastructure (V2I)), another vehicle (by Vehicle to Vehicle (V2V)), or a pedestrian (by Vehicle to Pedestrian (V2P)). The V2X communication unit may include an RF circuit capable of implementing a V2I protocol, a V2V protocol, and a V2P protocol.

The optical communication unit is a unit for communicating with an external device using light. The optical communication unit may include an optical transmitter for converting an electrical signal to an optical signal and emitting the optical signal to the outside, and an optical receiver for converting a received optical signal to an electrical signal.

In some embodiments, the optical transmitter may be integrated into a lamp included in the vehicle 1.

The broadcasting transceiver unit is a unit for receiving a broadcast signal from an external broadcasting management server or transmitting a broadcast signal to the broadcasting management server, on a broadcast channel. The broadcast channel may include a satellite channel and a terrestrial channel. The broadcast signal may include a TV broadcast signal, a radio broadcast signal, and a data broadcast signal.

The ITS communication unit may exchange information, data, or signals with a traffic system. The ITS communication unit may provide acquired information and data to the traffic system. The ITS communication unit may receive information, data, or a signal from the traffic system. For example, the ITS communication unit may receive traffic information from the traffic system and provide the received traffic information to the controller. For example, the ITS communication unit may receive a control signal from the traffic system, and provide the received control signal to the controller or a processor in the vehicle 1.

The memory 120 may be electrically connected to the controller 140. The memory 120 may store basic data of a predetermined unit, control data for control of an operation of a predetermined unit, and input and output data.

The memory 120 may be various storage devices such as ROM, RAM, EPROM, a flash drive, and a hard drive in terms of hardware. The memory 120 may store various data for an overall operation of the update system 100, such as a program for processing or controlling of the controller 140.

In some embodiments, the memory 120 may be integrated into the controller 140 or may be embodied as a low ranking component of the controller 140.

The interface unit 130 may serve as paths to various types of external devices connected to the update system 100. For example, the interface unit 130 may electrically connect various types of devices included in the vehicle 1 to the controller 140.

The interface unit 130 may serve as a channel for supplying electric energy to a connected external device. When the external device is electrically connected to the interface unit 130, the interface unit 130 may provide electric energy supplied from the power supply 150 to the external device under control of the controller 140.

The interface unit 130 may provide electric energy supplied from the outside of the update system 100 to the controller 140 under control of the controller 140.

The controller 140 may control an overall operation of each unit in the update system 100. The controller 140 may be referred to as an electronic control unit (ECU).

The controller 140 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electrical unit for performing other functions.

The controller 140 may perform computation using a public key encryption method. The controller 140 may perform computation of decrypting data, which is encrypted using a private key, using a public key.

The communication device 110, the memory 120, the interface unit 130, and the power supply 150 may have individual processors or may be integrated into the controller 140.

The power supply 150 may supply power required for an operation of each component under control of the controller 140. The power supply 150 may receive power from a battery, etc. in the vehicle 1.

Referring to FIG. 1, a server 200 may include a communication device 210, a memory 220, and a controller 240.

In some embodiments, the server 200 may not include some of the above components or may further include a new component in addition to the components.

The communication device 210 is used for communicating with an external device. The external device may be a vehicle, a mobile terminal, or another server.

The communication device 210 may include at least one of a transmission antenna and a reception antenna, for communication, or a Radio Frequency (RF) circuit and device, for implementing various communication protocols.

The communication device 210 may include a short-range communication unit, a location information unit, a vehicle-to-everything (V2X) communication unit, an optical communication unit, a broadcasting transceiver unit, an intelligent transport systems (ITS) communication unit, and a processor.

In some embodiments, the communication device 210 may further include a new component in addition to the components described below, or may not include some of the described components.

The description of the communication device 110 of the update system 100 may be applied to components of the communication device 210, which have the same names as in the communication device 110 of the update system 100.

The memory 220 may be electrically connected to the controller 240. The memory 220 may store basic data of a predetermined unit, control data for control of an operation of a predetermined unit, and input and output data.

The memory 220 may be various storage devices such as ROM, RAM, EPROM, flash drive, and hard drive in terms of hardware. The memory 220 may store various data for an overall operation of the server 200, such as a program for processing or controlling of the controller 240.

In some embodiments, the memory 220 may be integrated into the controller 240 or may be embodied as a low ranking component of the controller 240.

Information stored in the memory 220 will be described below in detail.

The controller 240 may control an overall operation of each unit in the server 200. The controller 240 may be referred to as an electronic control unit (ECU).

The controller 240 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electrical unit for performing other functions.

The communication device 210, the memory 220, an interface unit 230, and a power supply 250 may have individual processors or may be integrated into the controller 240.

<Overall Description of Update Method>

Figure 2:
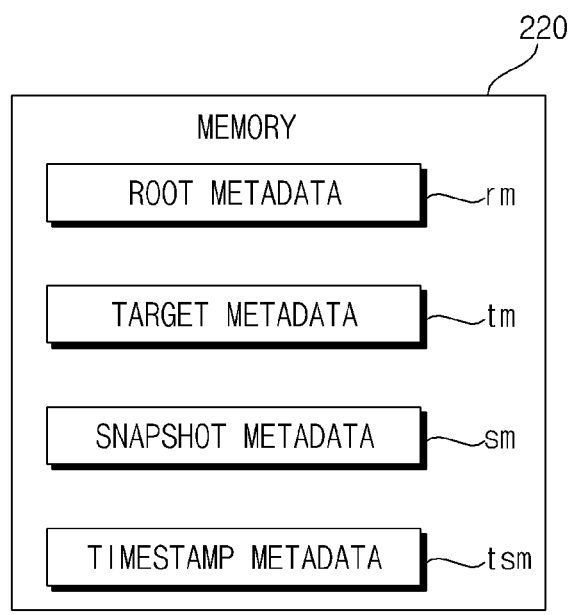
FIG. 2 is a diagram for explanation of a memory 220 of a server 200 according to an embodiment of the present invention.

FIG. 2 is a diagram for explanation of the memory 220 of the server 200 according to an embodiment of the present invention.

Figure 3:
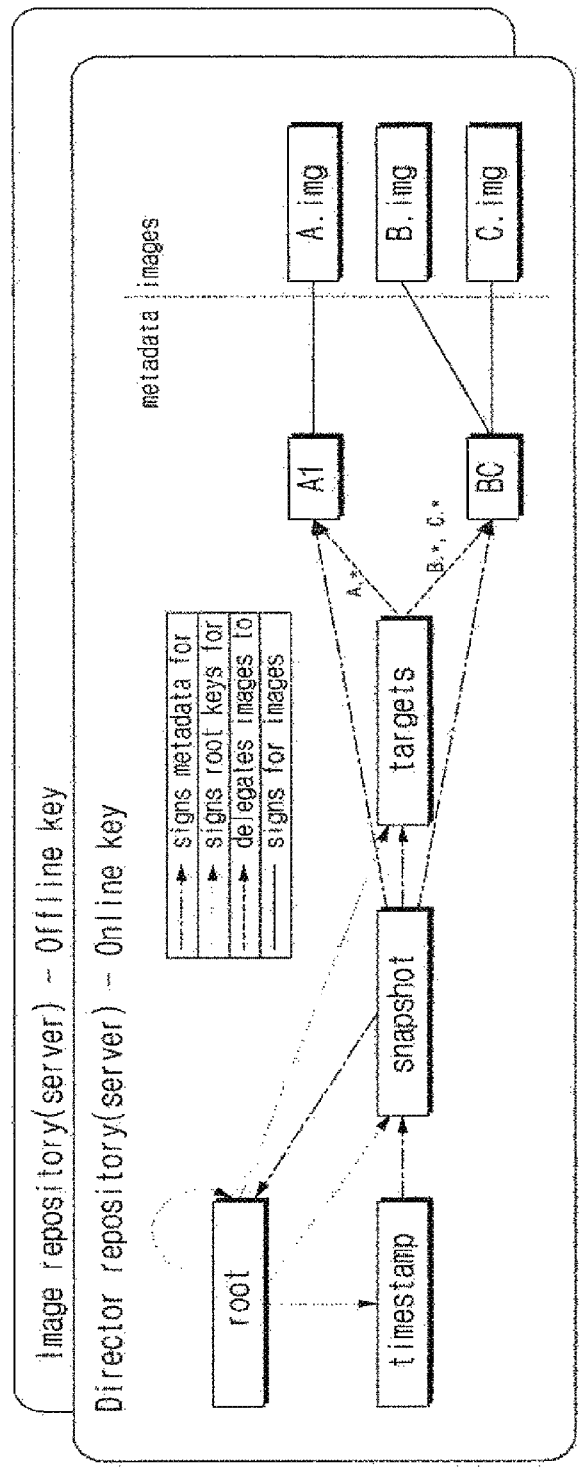
FIG. 3 is a diagram for explanation of the memory 220 of the server 200 according to an embodiment of the present invention.

FIG. 3 is a diagram for explanation of the memory 220 of the server 200 according to an embodiment of the present invention.

Referring to FIG. 2, the memory 220 may store root metadata rm, target metadata tm, snapshot metadata sm, and timestamp metadata tsm.

An update method using the update system 100 and the server 200 according to the present embodiment may use a public key cryptography (or an asymmetric cryptography). The public key cryptography is a method of verifying data encrypted using a private key (or a secret key) and is a well-known cryptography, and thus a detailed description thereof is omitted.

The update method using the update system 100 and the server 200 according to the present embodiment may be a method using a plurality of key roles according to an uptane design. The uptane design is a type of communication protocol for updating software and is designed to increase enhance security during communication for updating the vehicle 1.

The uptane design is a communication protocol using a plurality of metadata that function as different roles in order to increase security of data communication.

The root metadata rm may be used to check the reliability of the server 200.

The root metadata rm may be defined as data including a public key set and a root signature.

The public key set may include one or more public keys for verifying data on which a digital signature is performed.

The digital signature may be a method of identifying a transmitter in a public key system (or a public key infrastructure (PKI)), and a receiver may decrypt a message, which is encrypted using a secret key (or a private key) by the transmitter, using a public key of the transmitter. The public key system may be a system using a public key cryptography.

The public key set may include a root public key, a target public key, a snapshot public key, and a timestamp public key.

The root public key may be used to verify a root signature.

Referring to FIG. 3, the root signature may be data obtained by performing a digital signature on a hash value of a public key set including a root public key, a timestamp public key, a snapshot public key, and a target public key, using a root private key.

The hash value may be a value obtained using a hash function. The hash function may be a function for mapping data having an arbitrary length to data having a fixed length. The hash function needs to be deterministically executed, and thus when two hash values are different, original data for the hash values needs to be different.

The target metadata tm may be used to verify information on an encrypted hash value of an image (or update image) and the size of the image.

The target metadata tm may be defined as data including an image (or update data) and a target signature.

The target public key may be used to verify a target signature. The target signature may be data obtained by performing a digital signature on a hash value of update data for updating a device or system of the vehicle 1, using a target private key.

The snapshot metadata sm may be used to verify information on images distributed at the same time by the server 200.

The snapshot metadata sm may be defined as data including the target metadata tm and a snapshot signature.

The snapshot public key may be used to verify the snapshot signature. The snapshot signature may be data obtained by performing a digital signature on a hash value of the target metadata using the snapshot private key.

The timestamp metadata tsm may be used to indicate whether the new metadata or image resides on the server 200.

The timestamp metadata tsm may be defined as data including the snapshot metadata sm and a timestamp signature.

The timestamp public key may be used to verify a timestamp signature. The timestamp signature may be data obtained by performing a digital signature on a hash value of snapshot metadata using a timestamp private key.

According to an embodiment of the present invention, the update data may further metadata other than the aforementioned four metadata. For example, the update method may use director metadata.

The director metadata may be stored in the server 200 and may be used to determine a target (e.g., a target vehicle) to which the server 200 provides information. For example, the director metadata may enable the server 200 to provide data to a vehicle that acquires vehicle authentication number upon acquiring the vehicle authentication number from the vehicle.

Referring to FIG. 3, the server 200 according to an embodiment of the present invention may include an online server for storing metadata generated in an online environment, and an offline server for storing metadata generated in an offline environment.

The online server and the offline server will be described below.

The update system 100 of the vehicle 1 may directly communicate with the server 200 and may transmit and receive data.

Another vehicle may also communicate with the server 200 and may acquire data for updating another vehicle.

The update system 100 of the vehicle 1 may communicate with another device (e.g., an infrastructure) in which data acquired from the server 200 is stored and may acquire data for updating the vehicle 1.

In the update method configured in this way, the vehicle 1 may directly or indirectly communicate with the server 200 and may acquire data for updating the vehicle 1.

<Updating Process>

Figure 4:
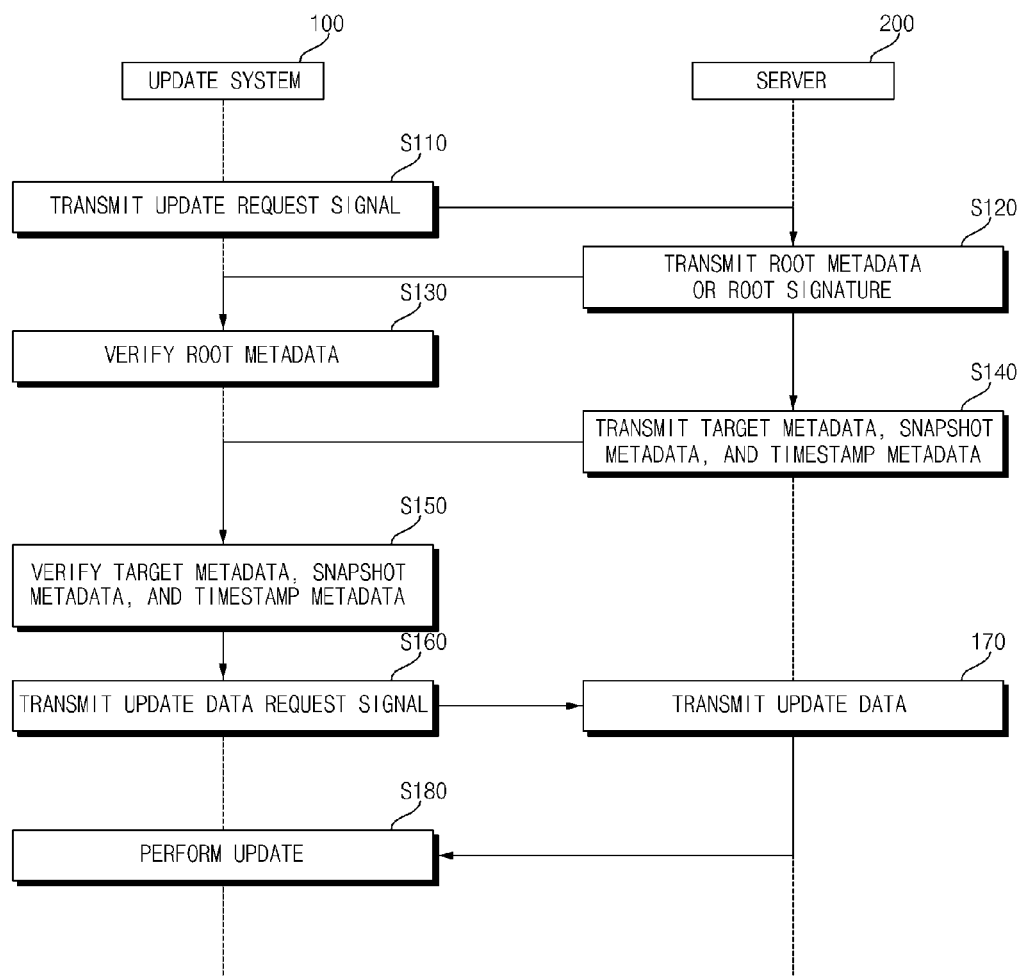
FIG. 4 is a diagram for explanation of an updating process according to an embodiment of the present invention.

FIG. 4 is a diagram for explanation of an updating process according to an embodiment of the present invention.

Hereinafter, when the server 200 performs transmission, reception, or an operation, this means that the controller 240 of the server 200 performs transmission, reception, or an operation. This is for easy description.

Referring to FIG. 4, the controller 140 may transmit an update request signal to the server 200 (S110).

The controller 140 may transmit the update request signal for a request for transmission of metadata to the server 200.

The controller 140 may determine whether a public key set is stored in the memory 120.

Upon determining that the public key set is stored in the memory 120, the controller 140 may make a request to the server 200 for a root signature. Upon determining that the public key set is stored in the memory 120, the controller 140 may make a request to the server 200 for the target metadata tm, the snapshot metadata sm, and the timestamp metadata tsm.

Upon determining that the public key set is not stored in the memory 120, the controller 140 may make a request to the server 200 for the root metadata rm. Upon determining that the public key set is not stored in the memory 120, the controller 140 may make a request to the server 200 for the target metadata tm, the snapshot metadata sm, and the timestamp metadata tsm.

In contrast, the controller 240 of the server 200 may determine whether the public key set is stored in the memory 120 of the update system 100. The controller 240 of the server 200 may determine whether the public key set is stored in the memory 120 of the update system 100, based on an update request signal received from the update system 100.

The server 200 may transmit the root metadata rm or the root signature to the update system 100 of the vehicle 1 (S120).

When the public key set is stored in the memory 120 of the update system 100, the server 200 may transmit the root signature to the update system 100.

When the public key set is not stored in the memory 120 of the update system 100, the server 200 may transmit the root metadata rm to the update system 100.

The public key set may include a root public key, a target public key, a snapshot public key, and a timestamp public key. The root public key may be used to verify a root signature obtained by performing a digital signature using the root private key. The target public key may be used to verify a target signature obtained by performing a digital signature using the target private key. The snapshot public key may be used to verify a snapshot signature obtained by performing a digital signature using the snapshot private key. The timestamp public key may be used to verify a timestamp signature obtained by performing a digital signature using the timestamp private key.

The root public key may include a key value, a key identification, a key type, and a threshold value.

The target public key may include a key value, a key identification, a key type, and a threshold value.

The snapshot public key may include a key value, a key identification, a key type, and a threshold value.

The timestamp public key may include a key value, a key identification, a key type, and a threshold value.

The key value may be a set of data items connected to each public key and may be defined as a pointer of data identified using a key or a location of the identified data. A key and a key value may be configured in one pair and may be used in a lookup table, a hash table, or the like.

The key identification may be defined as data used to identify each public key.

The key type may be defined as data used to identify a type of each public key.

The threshold value may be defined as data used to identify whether data satisfies a preset condition.

The controller 140 may acquire the root metadata rm or the root signature from the server 200.

When a public key set is stored in the memory 120, the controller 140 may acquire the root metadata rm from the server 200. The public key set may include a root public key for verifying a root signature.

When the public key set is not stored in the memory 120, the controller 140 may acquire the root metadata rm including the public key set and the root signature from the server 200. The root signature may be data obtained by performing a digital signature on a hash value of the public key set.

After acquiring the public key set from the server 200, the controller 140 may determine whether the public key set is changed.

When the public key set is changed after the public key set is acquired from server 200, the controller 140 may acquire, from the server 200, a root signature obtained by performing a digital signature on the changed public key set and the changed public key set using the root private key. That is, the controller 140 may also acquire the public key set from the server 200 when the public key set is stored in the memory 120 as well as when a public key set stored in the memory 120 is different from a public key set stored in the server 200.

Whether the public key set of the server 200 is changed after the controller 140 acquires the public key set from the server 200 may be determined by the controller 240 of the server 200.

In this case, upon determining that the public key set is changed after the public key set is transmitted to the controller 140, the server 200 may transmit root metadata including the changed public key set and a root signature to the controller 140 of the update system 100.

When the public key set is changed after the public key set is acquired from the server 200, the controller 140 may acquire, from the server 200, data indicating the changed part of the public key set and a root signature obtained by performing a digital signature on the changed public key set using a root private key. That is, when the public key set is changed, the controller 140 may acquire data of the changed part from the server 200.

The controller 140 may verify the root metadata (S130).

Upon acquiring only the root signature from the server 200, the controller 140 may verify the root metadata rm based on the acquired root signature and a public key set pre-stored in the memory 120.

Upon acquiring the root metadata rm from the server 200, the controller 140 may verify the root metadata rm based on the public key set of the acquired root metadata rm and the root signature. In this case, the controller 140 may store the public key set of the acquired root metadata rm in the memory 120.

The controller 140 may decrypt the root signature using the root public key.

The controller 140 may determine whether data obtained by decrypting the root signature using the root public key is the same as data of a hash value of the public key set.

Upon determining that the data obtained by decrypting the root signature using the root public key is the same as the data of the hash value of the public key set, the controller 140 may determine that the root metadata is completely verified.

The server 200 may transmit the target metadata tm, the snapshot metadata sm, and the timestamp metadata tsm to the update system 100 (S140).

Upon completely verifying the root metadata, the controller 140 may notify the server 200 about this to transmit the target metadata tm, the snapshot metadata sm, and the timestamp metadata tsm.

Upon completely verifying the root metadata rm, the server 200 may transmit the target metadata tm, the snapshot metadata sm, and the timestamp metadata tsm to the update system 100.

Although not shown, even before the root metal is not completely verified, the server 200 may transmit the target metadata tm, the snapshot metadata sm, and the timestamp metadata tsm.

The controller 140 may acquire the timestamp metadata tsm, the snapshot metadata sm, and the target metadata tm from the server 200.

The controller 140 may acquire the target metadata tm including update data and a target signature from the server 200. The target signature may be data obtained by performing a hash value of the update data using a target private key.

The controller 140 may acquire snapshot metadata including the target metadata tm and a snapshot signature from the server 200. The snapshot signature may be data obtained by performing a digital signature on the hash value of the target metadata tm using the snapshot private key.

The controller 140 may acquire the timestamp metadata tsm including the snapshot metadata sm and a timestamp signature from the server 200. The timestamp signature may be data obtained by performing a digital signature on a hash value of the snapshot metadata sm using the timestamp private key.

The controller 140 may verify the timestamp metadata, the snapshot metadata, and the target metadata (S150).

The controller 140 may verify the target metadata tm, the snapshot metadata sm, and the timestamp metadata tsm at the order at which they are acquired.

For example, upon determining that the target metadata tm is completely verified, the controller 140 may verify the snapshot metadata sm. Upon determining that the snapshot metadata sm is completely verified, the controller 140 may verify the timestamp metadata tsm.

Alternatively, the controller 140 may verify the target metadata tm, the snapshot metadata sm, and timestamp metadata at one time. The controller 140 may collectively or sequentially verify the target metadata tm, the snapshot metadata sm, and timestamp metadata depending on data processing capacity of the controller 140.

The controller 140 may verify the target metadata tm based on a target public key.

The controller 140 may decrypt a target signature using the target public key.

The controller 140 may determine whether data obtained by decrypting the target signature using the target public key is the same as data of a hash value of update data. The update data may be data included in the target metadata tm.

Upon determining that the data of the hash value of the update data of the acquired target metadata tm is the same as the data obtained by decrypting the target signature using the target public key, the controller 140 may determine that the target metadata tms is completely verified.

The controller 140 may verify the snapshot metadata sm based on the snapshot public key.

The controller 140 may decrypt the snapshot signature using the snapshot public key.

The controller 140 may determine that data obtained by decrypting a snapshot signature using a snapshot public key is the same as data of a hash value of the target metadata tm of the acquired snapshot metadata sm.

Upon determining that the data of the hash value of the target metadata tm of the acquired snapshot metadata sm is the same as the data obtained by decrypting the snapshot signature using the snapshot public key, the controller 140 may determine that the snapshot metadata sm is completely verified.

The controller 140 may verify the timestamp metadata tsm based on the timestamp public key.

The controller 140 may decrypt a timestamp signature using the timestamp public key.

The controller 140 may determine whether the data obtained by decrypting the timestamp signature using the timestamp public key is the same as data of the hash value of the snapshot metadata sm of the acquired timestamp metadata tsm.

Upon determining that the data of the hash value of the snapshot metadata sm of the acquired timestamp metadata tsm is the same as the data obtained by decrypting the timestamp signature using the timestamp public key, the controller 140 may determine that the timestamp metadata tsm is completely verified.

Upon determining that data is compromised while verifying the root metadata, the target metadata, the snapshot metadata, and the timestamp metadata, the controller 140 may stop the updating process.

For example, upon determining that the data obtained by decrypting the root signature using the root public key is not the same as the data of the hash value of the root public key as a verification result of the root metadata, the controller 140 may stop the updating process.

When the updating process is stopped, the controller 140 may notify the server 200 about this.

Upon determining that each of the root metadata rm, the timestamp metadata tsm, the snapshot metadata sm, and the target metadata tm is completely verified, the controller 140 may transmit an update data request signal to the server 200 (S160).

Upon receiving the update data request signal from the update system 100, the server 200 may transmit the update data to the update system 100 (S170).

The controller 140 may acquire the update data from the server 200.

The controller 140 may update at least one ECU of the vehicle 1 based on the acquired update data (S180). In addition, the controller 140 may update software of the controller 140 based on the acquired update data.

Figure 5:
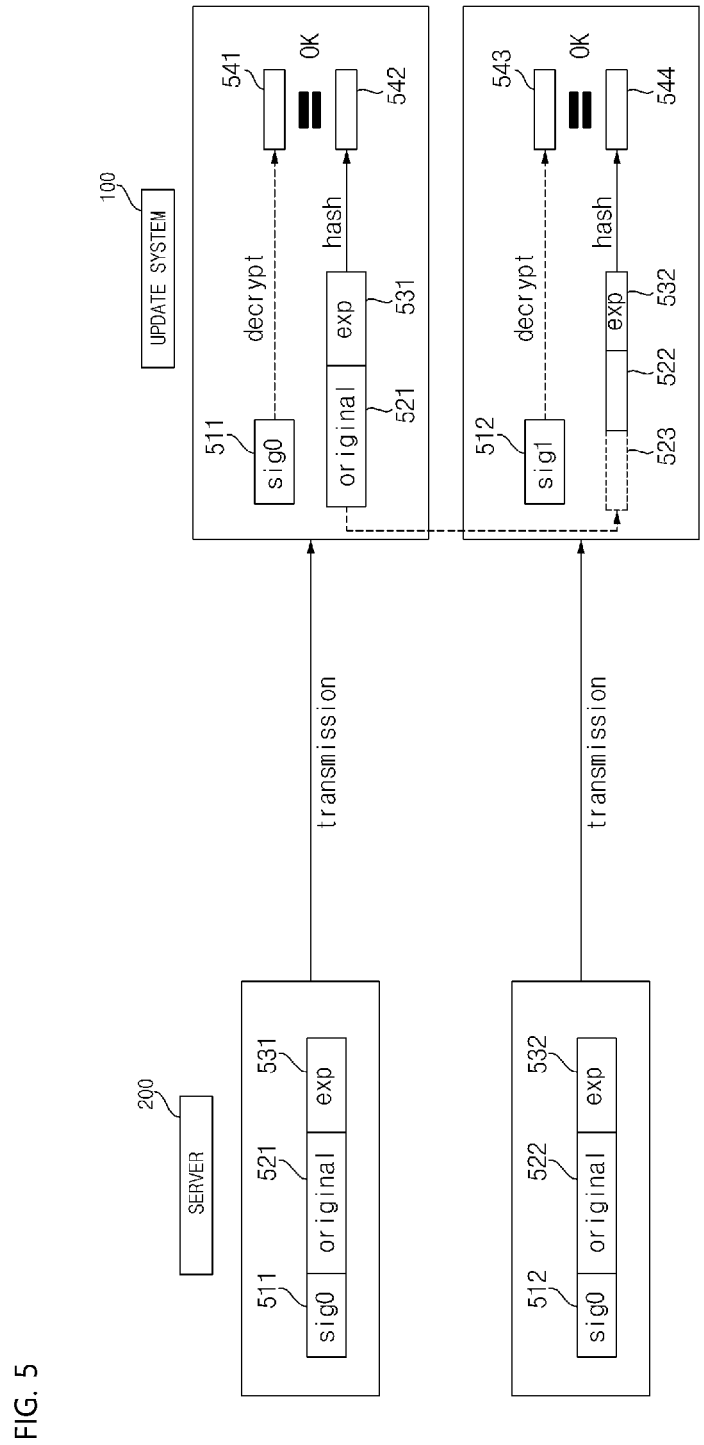
FIGS. 5 and 6 is a diagram for explanation of an update method according to an embodiment of the present invention.
Figure 6:
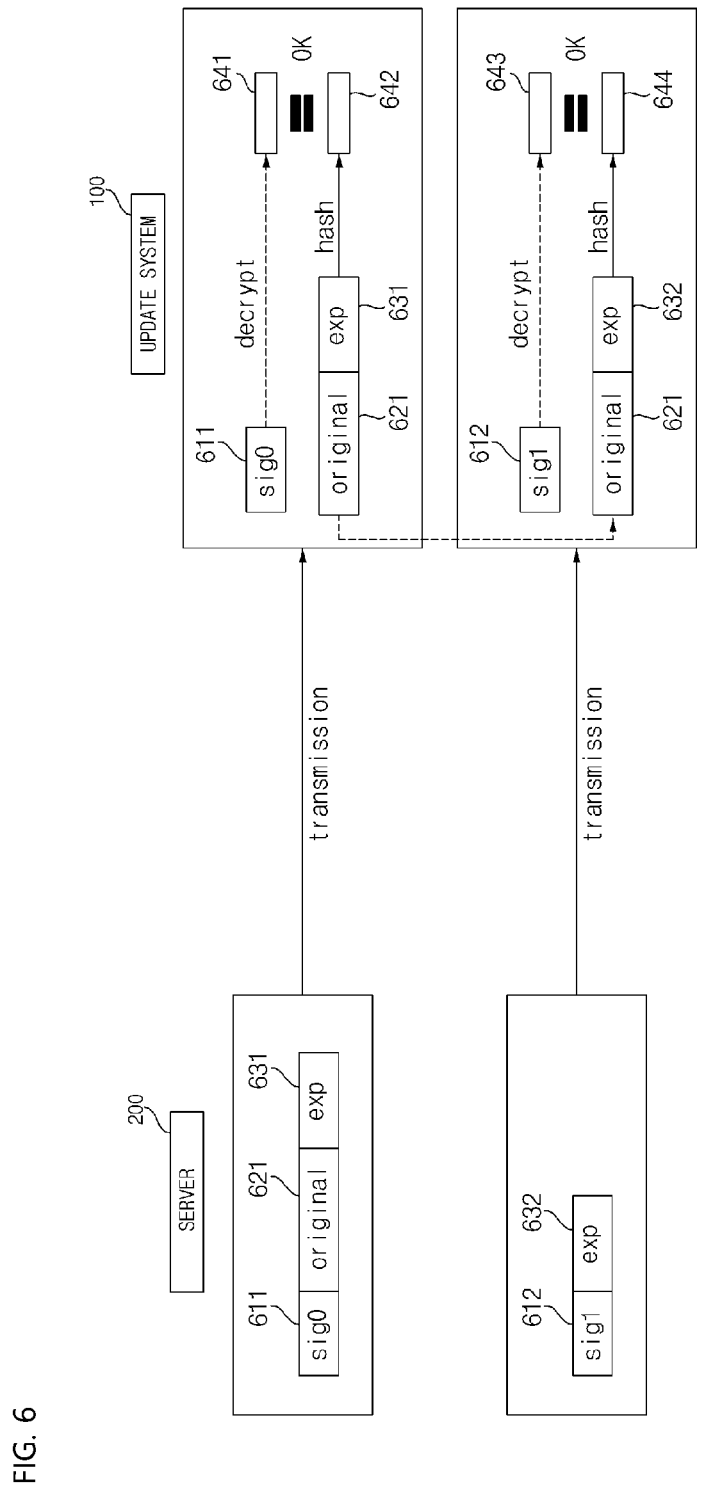

FIGS. 5 and 6 is a diagram for explanation of an update method according to an embodiment of the present invention.

Referring to FIG. 5, the server 200 may transmit a root signature 511, a public key set 521, and expired data 531 to the update system 100. The expired data 531 may be information related to a time period in which data transmitted to the update system 100 is effective.

The update system 100 may decrypt the root signature 511 acquired from the server 200 using a root private key.

The update system 100 may obtain a hash value of the public key set 521 and the expired data 531 acquired from the server 200.

The update system 100 may determine whether data 541 obtained by decrypting the root signature 511 using a root private key is the same as hash value data 542 of the public key set 521 and the expired data 531.

Upon determining that the data 541 obtained by decrypting the root signature 511 using the root private key is the same as the hash value data 542 of the public key set 521 and the expired data 531, the update system 100 may determine that the root metadata rm is completely verified.

Referring to FIG. 5, when the public key set is changed after the public key set 521 is transmitted to the update system 100, the server 200 may transmit data 522 of a changed part of the public key set to the update system 100.

When the public key set is changed after the public key set 521 is transmitted to the update system 100, the server 200 may transmit, to the update system 100, a root signature 512 obtained by performing a digital signature on the changed public key set using a root private key, the data 522 of the changed part of the public key set, and expired data 532.

The update system 100 may decrypt the root signature 512 acquired from the server 200 using a root private key.

The update system 100 may obtain a hash value of the data 522 of the changed part of the public key set, data 523 of the non-changed part of the public key set, and the expired data 532.

The update system 100 may determine whether data 543 obtained by decrypting the root signature 512 using a root private key is the same as hash value data 544 of the data 522 of the changed part of the public key set, the data 523 of the non-changed part of the public key set, and the expired data 532.

Upon determining whether the data 543 obtained by decrypting the root signature 512 using the root private key is the same as hash value data 544 of the data 522 of the changed part of the public key set, the data 523 of the non-changed part of the public key set, and the expired data 532, the update system 100 may determine that the root metadata rm is completely verified.

Referring to FIG. 6, the server 200 may transmit a root signature 611, a public key set 621, and expired data 631 to the update system 100. The expired data 631 may be information related to a time period in which data transmitted to the update system 100 is effective.

The update system 100 may decrypt the root signature 611 acquired from the server 200 using a root private key.

The update system 100 may obtain a hash value of the public key set 621 and the expired data 631 acquired from the server 200.

The update system 100 may determine whether data 641 obtained by decrypting the root signature 611 using the root private key is the same as hash value data 642 of the public key set 621 and the expired data 631.

Upon determining the data 641 obtained by decrypting the root signature 611 using the root private key is the same as the hash value data 642 of the public key set 621 and the expired data 631, the update system 100 may determine that the root metadata rm is completely verified.

Referring to FIG. 6, when a public key set is not changed after the public key set 621 is transmitted to the update system 100, the server 200 may transmit, to the update system 100, a root signature 612 obtained by performing a digital signature on the public key set 621 using a root private key and the expired data 632.

The update system 100 may decrypt the root signature 612 obtained from the server 200 using a root private key.

The update system 100 may obtain a hash value of the public key set 621 and expired data 632 stored in the memory 120.

The update system 100 may determine whether data 643 obtained by decrypting the root signature 612 using a root private key is the same as hash value data 644 of the public key set 621 and the expired data 632.

Upon determining that the data 643 obtained by decrypting the root signature 612 using the root private key is the same as the hash value data 644 of the public key set 621 and the expired data 632, the update system 100 may determine that the root metadata rm is completely verified.

When the update method configured in this way is used, if the root metadata rm is transmitted to the update system 100, data related to the changed part may be selectively transmitted to reduce a transmission amount of data transmitted to the update system 100 from the server 200, thereby increasing a verifying speed of root metadata.

When the update method according to the present embodiment is used, the amount of data transmitted to the update system 100 from the server 200 may be reduced, and thus forging, falsification, or the like of data during a data communication procedure may be prevented.

Second Embodiment

<Configuration>

Figure 7:
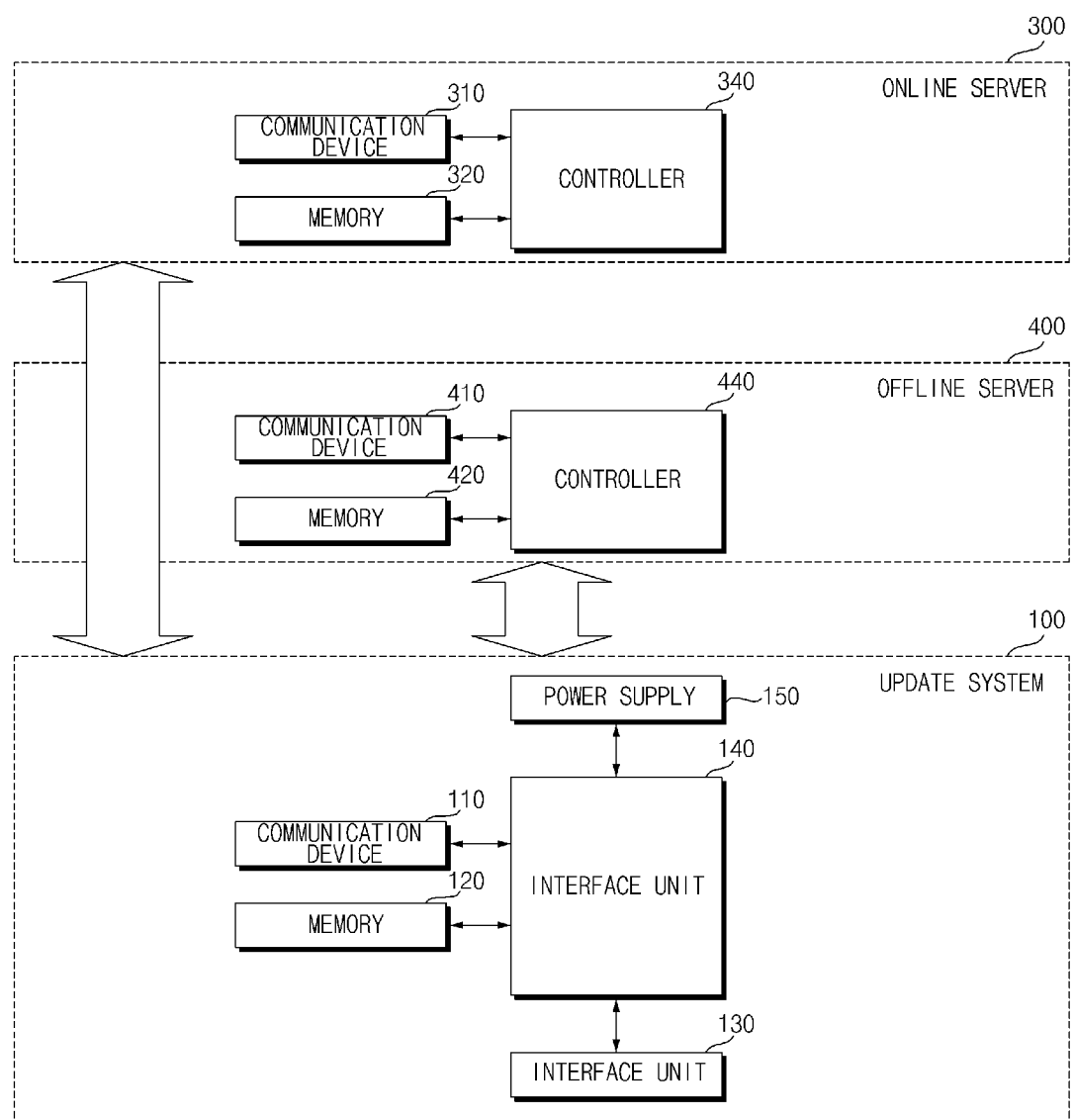
FIG. 7 is a block diagram for explanation of a configuration a vehicular update system according to another embodiment of the present invention.

FIG. 7 is a block diagram for explanation of a configuration a vehicular update system according to another embodiment of the present invention.

In a description of a vehicular update system according to a second embodiment of the present invention, a detailed description of the same components as those of the vehicular update system according to the first embodiment of the present invention is omitted.

The update system 100 according to the second embodiment of the present invention may include components the same or similar to the components of the update system 100 according to the first embodiment of the present invention. The description of the update system 100 according to the first embodiment of the present invention may be applied to the update system 100 according to the second embodiment of the present invention.

The server 200 according to the second embodiment may include an online server 300 and an offline server 400.

The online server 300 may be defined as a server for storing root metadata, timestamp metadata, snapshot metadata, and target metadata, which are generated in an online environment.

In addition, the offline server 400 may be defined as a server for storing root metadata, timestamp metadata, snapshot metadata, and target metadata, which are generated in an offline environment.

The offline server 400 may be connected to the online server 300 through a separate communication network and may acquire data from the online server 300.

The offline server 400 may be disconnected from the online server 300 and may acquire and generate separate data.

The controller 140 may acquire update data from the online server 300 for storing root metadata, timestamp metadata, snapshot metadata, and target metadata, which are generated in an online environment.

In addition, the controller 140 may acquire update data from an offline server for storing root metadata, timestamp metadata, snapshot metadata, and target metadata, which are generated in an offline environment.

When preset importance of software as an update target is equal to or greater than a reference value, the controller 140 may acquire update data from the offline server 400.

The software that is an update target may be software of an ECU, which is an update target acquired from a server by the controller 140.

The importance of the software that is the update target may be a value set in each ECU in a manufacturing process.

The controller 140 may compare the preset importance of the software that is the update target with a reference value stored in the memory 120 and may determine whether the preset importance of the software that is the update target is equal to or greater than the reference value.

Upon determining that the preset importance of the software that is the update target is equal to or greater than the reference value, the controller 140 may acquire update data from the offline server 400. As such, update data of software having high importance may be acquired from the offline server 400 that has relatively high security compared with the online server 300, and thus an entity that acquires the update data may be determined according to a required security degree.

<Updating Process>

Figure 8:
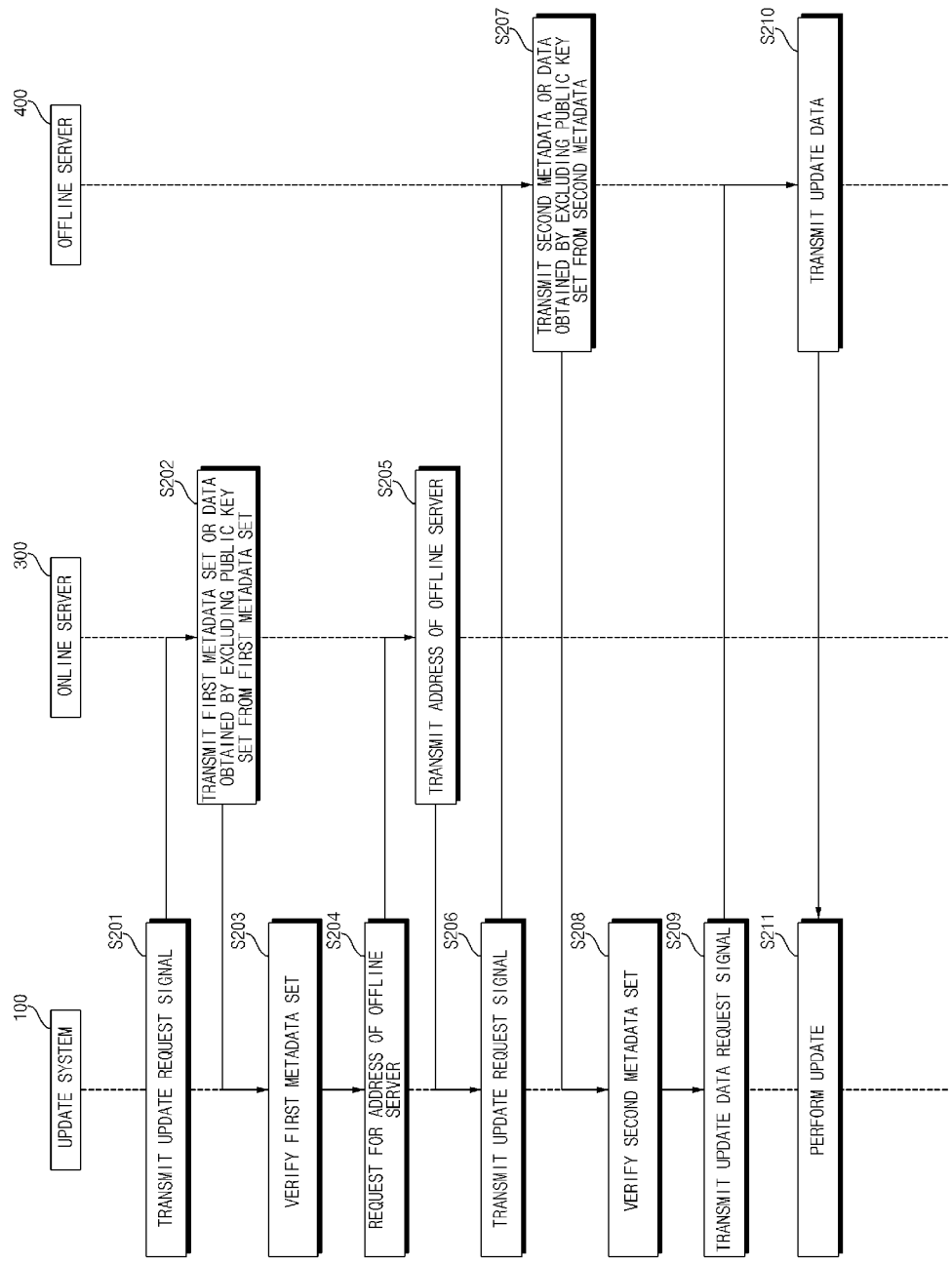
FIG. 8 is a diagram for explanation of an updating process according to the second embodiment of the present invention.

FIG. 8 is a diagram for explanation of an updating process according to the second embodiment of the present invention.

Hereinafter, when the online server 300 or the offline server 400 performs transmission, reception, or an operation, this means that a controller 340 of the online server 300 or a controller 440 of the offline server 400 performs transmission, reception, or an operation. This is for easy description.

Referring to FIG. 8, the controller 140 may transmit an update request signal to the online server 300 (S201).

Upon receiving an update request signal from the update system 100, the online server 300 may transmit, to the update system 100, a first metadata set or data obtained by excluding a public key set from the first metadata set (S202).

The first metadata set may be defined as data including root metadata, timestamp metadata, snapshot metadata, and target metadata, which are generated in an online environment.

When a public key set is stored in the memory 120 of the update system 100, the online server 300 may transmit, the update system 100, root signature, target metadata, snapshot metadata, and timestamp metadata, which are the data obtained by excluding the public key set from the first metadata set.

When the public key set is not stored in the memory 120 of the update system 100, the online server 300 may transmit the first metadata set to the update system 100.

The controller 140 may acquire the first metadata set or the data obtained by excluding the public key set from the first metadata set from the online server 300.

The controller 140 may verify the first metadata set (S203).

Upon acquiring only a root signature from the online server 300, the controller 140 may verify the root metadata based on the acquired root signature and the public key set preset in the memory 120.

Upon acquiring the root metadata from the online server 300, the controller 140 may verify the root metadata based on the public key set of the acquired root metadata and a root signature. In this case, the controller 140 may store the public key set of the acquired root metadata in the memory 120.

Upon determining that the data obtained by decrypting the root signature using the root public key is the same as data of a hash value of the public key, the controller 140 may determine that the root metadata is verified.

The controller 140 may verify the target metadata, the snapshot metadata, and the timestamp metadata. The target metadata, the snapshot metadata, and the timestamp metadata may be verified in the same or similar way to step S150 of FIG. 4.

Upon determining that the first metadata set is completely verified, the controller 140 may make a request to the online server 300 for an address of the offline server 400.

When there is a request for the address of the offline server 400 from the update system 100, the online server 300 may transmit the address of the offline server 400 to the update system 100 (S205).

The controller 140 may access the offline server 400 based on the address of the offline server 400 acquired from the online server 300. The controller 140 may access the offline server 400 and may transmit an update request signal to the offline server 400 (S206).

Upon receiving an update request signal from the update system 100, the offline server 400 may transmit a second metadata set or data obtained by excluding a public key set from the second metadata set (S207).

Step S207 in which the offline server 400 transmits the second metadata set or the data obtained by excluding the public key set from the second metadata set may include the step the same or similar to step S202 in which the online server 300 transmits the first metadata set or the data obtained by excluding the public key set from the first metadata set. The description of step S202 may be applied to step S207 in which the offline server 400 transmits the second metadata set or the data obtained by excluding the public key set from the second metadata set.

The controller 140 may acquire, from the offline server 400, the second metadata set or the data obtained by excluding the public key set from the second metadata set.

The controller 140 may verify the second metadata set (S208).

Step S208 in which the controller 140 verifies the second metadata set may include the step the same or similar to step S203 in which the controller 140 verifies the first metadata set. The description of step S203 may be applied to step S208 in which the controller 140 verifies the second metadata set.

Upon determining that the second metadata set is completely verified, the controller 140 may transmit an update data request signal to the offline server 400 (S209).

Upon receiving the update data request signal from the update system 100, the offline server 400 may transmit update data to the update system 100 (S210).

Upon receiving the update data from the offline server 400, the controller 140 may update software of at least one ECU of the vehicle 1 based on the update data (S211).

The control method of the update system configured in this way may use the online server 300 for verifying data and providing an address of an offline server and the offline server 400 for verifying data and providing update data, thereby enhancing a security level of data.

The control method of the update system may selectively acquire update data from the online server or the offline server depending on the importance of software that is an update target, and thus a method that has a high security level in spite of a prolonged time for updating due to importance may be selected.

In the control method of the update system, even if any one of the online server 300 and the offline server 400 is hacked, this may be detected and the update system 100 of the vehicle 1 may be prevented from being hacked.

Third Embodiment

<Configuration>

Figure 9:
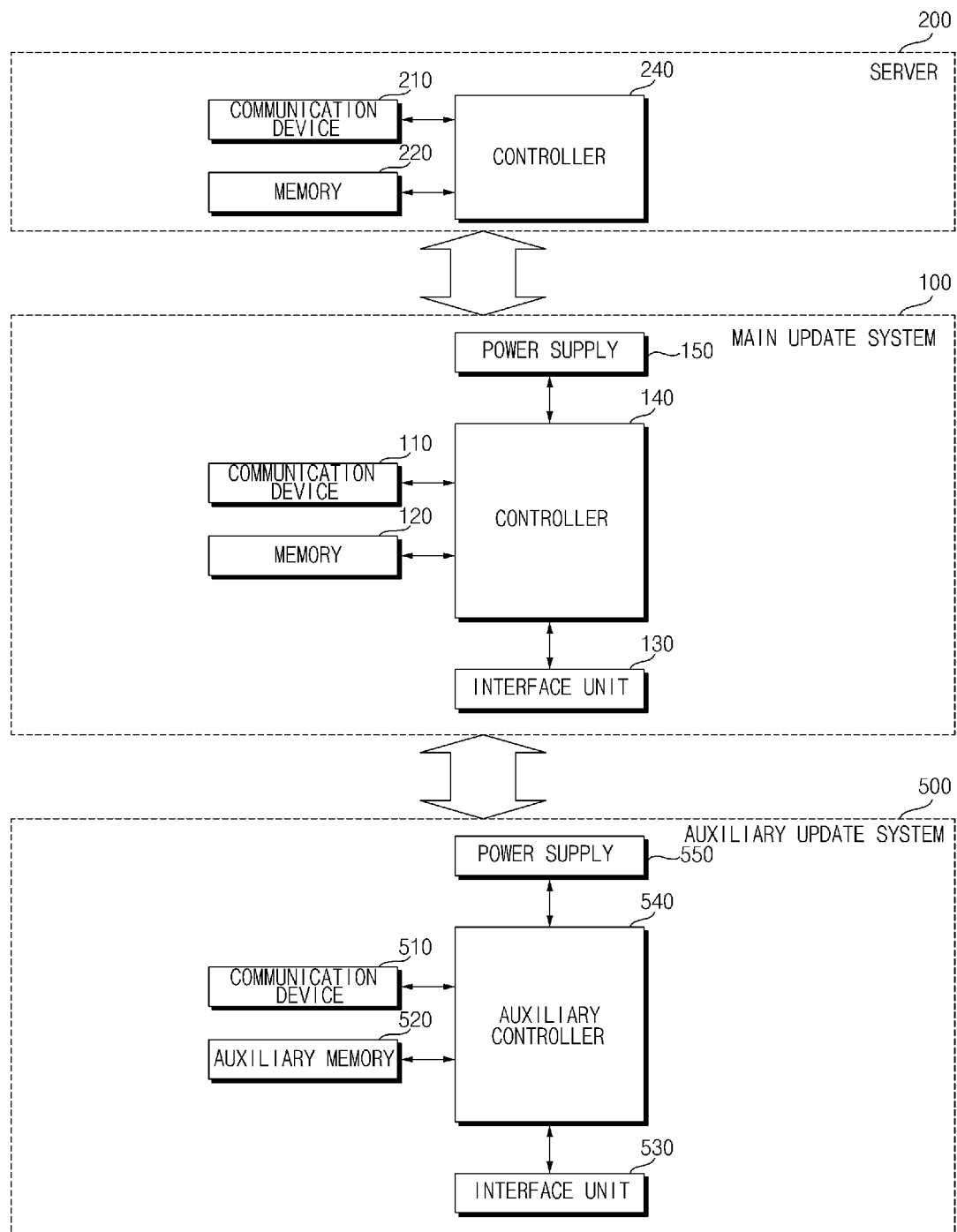
FIG. 9 is a block diagram for explanation of a configuration of a vehicular update system according to another embodiment of the present invention.

FIG. 9 is a block diagram for explanation of a configuration of a vehicular update system according to another embodiment of the present invention.

In a description of a vehicular update system according to a third embodiment of the present invention, a detailed description of the same components as those of the vehicular update system according to the first embodiment of the present invention is omitted.

Hereinafter, in the description of the third embodiment of the present invention, the update system 100 will be referred to as the main update system 100 for distinguishing from an auxiliary update system 500.

The main update system 100 according to the third embodiment of the present invention may include components the same or similar to the update system 100 according to the first embodiment of the present invention. The description of the update system 100 according to the first embodiment of the present invention may be applied to components with the same reference numerals as those of the update system 100 according to the first embodiment among components of the main update system 100 according to the second embodiment of the present invention.

Referring to FIG. 9, the auxiliary update system 500 may include a communication device 510, an auxiliary memory 520, an interface unit 530, an auxiliary controller 540, and a power supply 550.

In some embodiments, the auxiliary update system 500 may not include some of the above components or may further include a new component in addition to the components.

The auxiliary update system 500 may be included in the vehicle 1.

The communication device 510 may be a device for in-vehicle communication.

For example, the communication device 510 may be a device for in-vehicle network (IVN) communication.

The communication device 510 may communicate with the communication device 110 of the main update system 100 and may transmit and receive data.

The auxiliary memory 520 may be electrically connected to the auxiliary controller 540. The auxiliary memory 520 may store basic data of a predetermined unit, control data for control of an operation of a predetermined unit, and input and output data.

The auxiliary memory 520 may be various storage devices such as ROM, RAM, EPROM, a flash drive, and a hard drive in terms of hardware. The auxiliary memory 520 may store various data for an overall operation of the auxiliary update system 500, such as a program for processing or controlling of the auxiliary controller 540.

In some embodiments, the auxiliary memory 520 may be integrated into the auxiliary controller 540 or may be embodied as a low ranking component of the auxiliary controller 540.

The interface unit 530 may serve as paths to various types of external devices connected to the auxiliary update system 500. For example, the interface unit 530 may electrically connect various types of devices included in the vehicle 1 to the auxiliary controller 540.

The interface unit 530 may serve as a channel for supplying electric energy to a connected external device. When the external device is electrically connected to the interface unit 530, the interface unit 530 may provide electric energy supplied from the power supply 550 to the external device under control of the auxiliary controller 540.

The interface unit 530 may provide electric energy supplied from the outside of the auxiliary update system 500 to the auxiliary controller 540 under control of the auxiliary controller 540.

The auxiliary controller 540 may control an overall operation of each unit in the auxiliary update system 500. The auxiliary controller 540 may be referred to as an electronic control unit (ECU).

The auxiliary controller 540 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electrical unit for performing other functions.

The auxiliary controller 540 may perform computation using a public key cryptography. The auxiliary controller 540 may perform computation of decrypting data, which is encrypted using a private key, using a public key.

The communication device 510, the auxiliary memory 520, the interface unit 530, and the power supply 550 may have individual processors or may be integrated into the auxiliary controller 540.

The power supply 550 may supply power required for an operation of each component under control of the auxiliary controller 540. The power supply 550 may receive power from a battery, etc. in the vehicle 1.

<Updating Process>

Figure 10:
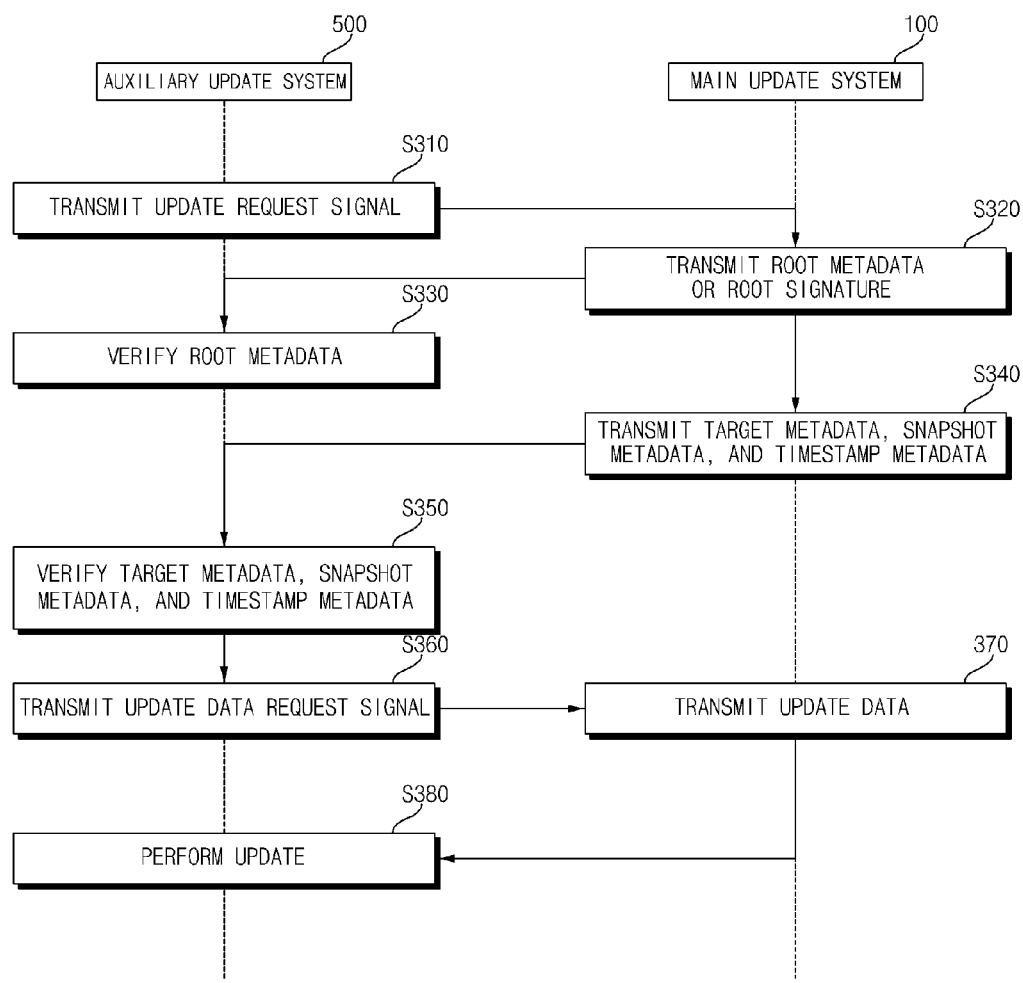
FIG. 10 is a diagram for explanation of an updating process according to another embodiment of the present invention.

FIG. 10 is a diagram for explanation of an updating process according to another embodiment of the present invention.

Referring to FIG. 10, the auxiliary controller 540 may transmit an update request signal to the main controller 140 (S310).

Upon receiving the update request signal from the auxiliary controller 540, the main controller 140 may transmit root metadata or a root signature to the auxiliary controller 540 (S320).

When the public key set stored in the main memory 120 is stored in the auxiliary memory 520, the main controller 140 may transmit the root signature to the auxiliary controller 540.

When the public key set stored in the main memory 120 is not stored in the auxiliary memory 520, the main controller 140 may transmit the root metadata to the auxiliary controller 540.

Step S320 in which the main controller 140 transmits the root metadata or the root signature to the auxiliary controller 540 may include the step the same or similar to step S120 (FIG. 4) in which the controller 240 of the server 200 transmits the root metadata or the root signature to the controller 140. The description of step S120 may be applied to step S320.

The auxiliary controller 540 may verify the root metadata (S330).

Upon acquiring the root metadata from the main controller 140, the auxiliary controller 540 may verify the root metadata based on a public key set of the acquired root metadata and the root signature. Upon acquiring the root metadata from the main controller 140, the auxiliary controller 540 may store the public key set of the acquired root metadata.

Upon acquiring only the root signature from the main controller 140, the auxiliary controller 540 may verify the root metadata based on the acquired root signature and a public key set stored in the auxiliary memory.

Step S330 in which the auxiliary controller 540 verifies the root metadata may include the step the same or similar to step S130 (FIG. 4) in which the controller 140 verifies the root metadata. The description of step S130 may be applied to step S330.

The main controller 140 may transmit target metadata, snapshot metadata, and timestamp metadata to the auxiliary controller 540 (S340).

Step S340 in which the main controller 140 transmits the target metadata, the snapshot metadata, and the timestamp metadata to the auxiliary controller 540 may include the step the same or similar to step S140 (FIG. 4) in which the server 200 transmits the target metadata, the snapshot metadata, and the timestamp metadata to the update system 100. The description of step S140 may be applied to step S340.

The auxiliary controller 540 may verify the timestamp metadata, the snapshot metadata, and the target metadata (S350).

Step S350 in which the auxiliary controller 540 verifies the timestamp metadata, the snapshot metadata, and the target metadata may include the step the same or similar to step S150 (FIG. 4) in which the main controller 140 verifies the timestamp metadata, the snapshot metadata, and the target metadata. The description of step S150 may be applied to step S350.

Upon determining that the root metadata, the timestamp metadata, the snapshot metadata, and the target metadata are each completely verified, the auxiliary controller 540 may transmit an update data request signal to the main controller 140 (S360).

Upon receiving the update data request signal from the auxiliary controller 540, the main controller 140 may transmit update data to the auxiliary controller 540 (S370).

The auxiliary controller 540 may update at least one ECU of the vehicle 1 based on the update data acquired from the main controller 140 (S380). Alternatively, the auxiliary controller 540 may update software of the auxiliary controller 540 based on the update data.

In the control method of the update system configured in this way, the update data may be shared in a plurality of controllers through an in-vehicle network (IVN), and in this case, a data verification procedure may be performed, thereby preventing damages due to forging or falsification of data.

Figure 11:
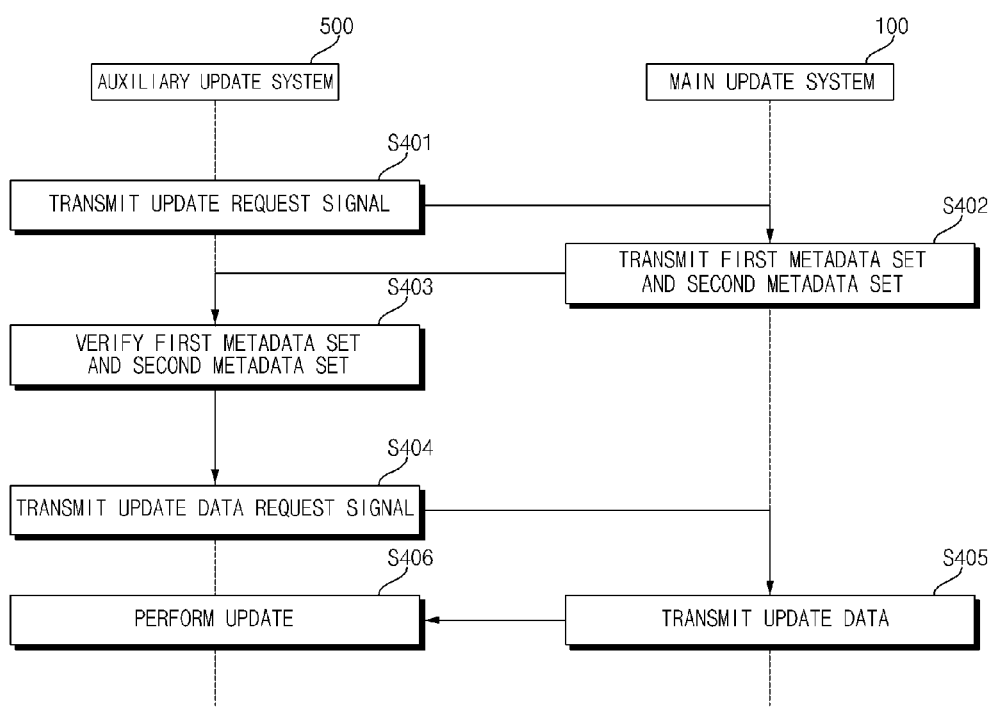
FIG. 11 is a diagram for explanation of an updating process according to another embodiment of the present invention.

FIG. 11 is a diagram for explanation of an updating process according to another embodiment of the present invention.

Referring to FIG. 11, the auxiliary controller 540 may acquire update data update data from the main controller 140 that acquires metadata from an online server and an offline server.

The main controller 140 may store the first metadata set, the second metadata set, and the update data, acquired through steps S201 to S210 of FIG. 8, in the memory 120.

The main controller 140 may acquire, from the online server, a first metadata set or data obtained by excluding a public key set from the first metadata set.

The main controller 140 may acquire, from the offline server 400, a second metadata set or data obtained by excluding a public key set from the second metadata set.

The auxiliary controller 540 may transmit an update request signal to the main controller 140 (S401).

Upon receiving the update request signal from the auxiliary controller 540, the main controller 140 may transmit the first metadata set and the second metadata set to the auxiliary controller 540 (S402).

The auxiliary controller 540 may acquire, from the main controller 140, a first metadata set or data obtained by excluding a public key set from the first metadata set.

The auxiliary controller 540 may acquire, from the main controller 140, a second metadata set or data obtained by excluding a public key set from second metadata set.

The auxiliary controller 540 may verify the first metadata set and the second metadata set (S403).

Steps S402 and S403 may include steps S320 to S350 of FIG. 10 or similar steps thereto. The description of steps S320 to S350 may be applied to steps S402 and S403.

Upon determining that the first metadata set and the second metadata set are completely verified, the auxiliary controller 540 may transmit the update data request signal to the main controller 140 (S404).

Upon receiving the update data request signal, the main controller 140 may transmit the update data to the auxiliary controller 540 (S405).

Upon receiving the update data from the main controller 140, the auxiliary controller 540 may update software of at least one ECU of the vehicle 1 based on the update data (S406).

When the update method configured in this way is used, a plurality of ECUs in a vehicle may be safely updated.

Through a procedure in which data acquired by online and offline servers are verified by a plurality of ECUs, a security level of data may be increased with respect to an ECU with high importance.

A plurality of metadata having different functions may be used, and thus even if anyone thereof is hacked, a range of forged or falsified data may be limited to minimize data due to hacking.

The invention can also be embodied as computer readable code on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), ROM, RAM, CD-ROM, magnetic tapes, floppy disks, optical data storage devices, etc. and include a carrier wave (for example, a transmission over the Internet). In addition, the computer may include a processor or a controller. Accordingly, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed:

1. A vehicular update system comprising:
   a transceiver configured to communicate between a server and a controller included in a vehicle;
   a memory; and
   a controller electrically connected to the transceiver and the memory, and configured to, (i) when a public key set including a root public key for verifying a root signature is stored in the memory, acquire the root signature from the server and verify root metadata based on the acquired root signature and the root public key of the public key set pre-stored in the memory, and configured to, (ii) when the public key set is not stored in the memory, acquire, from the server, root metadata including a public key set and a root signature obtained by performing a digital signature on a hash value of the public key set using a root private key, verify the root metadata based on the root public key of the acquired root metadata and the root signature, and store the public key set.

2. The vehicular update system of claim 1, wherein, when the public key set is changed after the public key set is acquired from the server, the controller acquires, from the server, the changed public key set and the root signature obtained by performing a digital signature on the changed public key set using the root private key.

3. The vehicular update system of claim 1, wherein, when the public key set is changed after the public key set is acquired from the server, the controller acquires, from the server, data indicating the changed part of the public key set and the root signature obtained by performing a digital signature on the changed public key set using the root private key.

4. The vehicular update system of claim 1, wherein, upon determining that data obtained by decrypting the root signature using the root public key is the same as data of a hash value of the public key set, the controller determines that the root metadata is completely verified.

5. The vehicular update system of claim 1, wherein the public key set includes a target public key for verifying a target signature; and
   wherein the controller acquires, from the server, target metadata including update data and a target signature obtained by performing a digital signature on a hash value of the update data using a target private key, and verifies the target metadata based on the target public key.

6. The vehicular update system of claim 5, wherein the public key set includes a snapshot public key for verifying a snapshot signature; and
   wherein the controller acquires, from the server, snapshot metadata including target metadata and a snapshot signature obtained by performing a digital signature on a hash value of the target metadata using a snapshot private key, and verifies the snapshot metadata based on the snapshot public key.

7. The vehicular update system of claim 6, wherein the public key set includes a timestamp public key for verifying a timestamp signature; and wherein the controller acquires, from the server, timestamp metadata including snapshot metadata and the timestamp signature obtained by performing a digital signature on a hash value of the snapshot metadata using a timestamp private key, and verifies the timestamp metadata based on the timestamp public key.

8. The vehicular update system of claim 7, wherein, upon determining that each of the root metadata, the timestamp metadata, the snapshot metadata, and the target metadata is completely verified, the controller transmits an update data request signal to the server, and acquires update data from the server.

9. The vehicular update system of claim 7, wherein the public key set includes the root public key, the timestamp public key, the snapshot public key, and the target public key, which each include a key value, a key identification, a key type, and a threshold value.

10. The vehicular update system of claim 1, wherein the controller acquires update data from an online server for storing root metadata, timestamp metadata, snapshot metadata, and target metadata (hereinafter, 'first metadata set'), which are generated in an online environment, or wherein the controller is connected to the online server through a separate communication network, and acquires update data from an offline server for storing root metadata, timestamp metadata, snapshot metadata, and target metadata (hereinafter, 'second metadata set'), which are generated in an offline environment.

11. The vehicular update system of claim 10, wherein the controller transmits an update request signal to the online server, acquires a first metadata set or data obtained by excluding the public key set from the first metadata set, from the online server, and verifies the first metadata set, and upon determining that the first metadata set is completely verified, the controller makes a request to the online server for an address of the offline server, accesses the offline server based on the address of the offline server, transmits an update request signal to the offline server, acquires, from the offline server, a second metadata set or data obtained by excluding a public key set from the second metadata set, and verifies the second metadata set, and upon determining that the second metadata set is completely verified, the controller transmits an update data request signal to the offline server.

12. The vehicular update system of claim 10, wherein, when preset importance of software that is an update target is equal to or greater than a reference value, the controller acquires update data from the offline server.

13. The vehicular update system of claim 1, wherein the controller includes a main controller configured to acquire update data from the server and an auxiliary controller configured to acquire the update data from the main controller; and wherein the memory includes a main memory electrically connected to the main controller and an auxiliary memory electrically connected to the auxiliary controller.

14. The vehicular update system of claim 13, wherein, upon receiving an update request signal from the auxiliary controller, the main controller transmits a root signature to the auxiliary controller when the public key set stored in the main memory is stored in the auxiliary memory, and transmits root metadata to the auxiliary controller when the public key set stored in the main memory is not stored in the auxiliary memory; and upon acquiring the root metadata from the main controller, the auxiliary controller verifies the root metadata based on the public key set of the acquired root metadata and the root signature, and stores the public key set, and upon acquiring only the root signature from the main controller, the auxiliary controller verifies the root metadata based on the acquired root signature and the public key set stored in the auxiliary memory.

15. The vehicular update system of claim 14, wherein the main controller acquires, from an online server, a first metadata set or data obtained by excluding the public key set from the first metadata set, and acquires, from an offline server, a second metadata set or data obtained by excluding the public key set from the second metadata set;

wherein, upon receiving an update request signal from the auxiliary controller, the main controller provides the first metadata set and the second metadata set to the auxiliary controller, and the auxiliary controller verifies the first metadata set and the second metadata set acquired from the main controller; and wherein, upon determining that the first metadata set and the second metadata set are completely verified, the auxiliary controller transmits an update data request signal to the main controller.

16. A control method of a vehicular update system, the method comprising:

a update request step of transmitting an update request signal to a server, by a controller included in a vehicle;

a verification data acquisition step of, upon determining a public key set is stored in a memory, acquiring a root signature from the server for storing the public key set and the root signature, and upon determining the public key is not stored in the memory, acquiring root metadata from the server, by the controller; and a data verification step of, upon acquiring only the root signature from the server, verifying the root metadata based on the acquired root signature and the public key set stored in the memory, and upon acquiring the root metadata from the server, verifying the root metadata based on the public key set of the acquired root metadata and the root signature and stores the public key set, by the controller.

17. The method of claim 16, wherein the verification data acquisition step includes, when the public key set is changed after the public key set is acquired from the server, acquiring the changed public key set and the root signature obtained by performing a digital signature on the changed public key set, from the server, by the controller.

18. The method of claim 16, wherein the verification data acquisition step includes acquiring timestamp metadata, snapshot metadata, and target metadata from the server, by the controller;

wherein the data verification step includes verifying the timestamp metadata, the snapshot metadata, and the target metadata, by the controller, further comprising: after the data verification step, an update data request step of transmitting an update data request signal to the server upon determining that each of the root metadata, the timestamp metadata, the snapshot metadata, and the target metadata is completely verified, by the controller; and an update data acquisition step of acquiring update data from the serer, by the controller.

19. The method of claim 18, wherein the server is an online server for storing root metadata, timestamp metadata, snapshot metadata, and target metadata, which are generated in an online environment, or
- an offline server that is connected to the online server through a separate communication network and stores root metadata, timestamp metadata, snapshot metadata, and target metadata, which are generated in an offline environment.

20. The method of claim 18, further comprising: after the update data acquisition step, an auxiliary controller update step of acquiring update data from the controller, by an auxiliary controller included in a vehicle.

\* \* \* \* \*